UNITED STATES PATENT OFFICE.

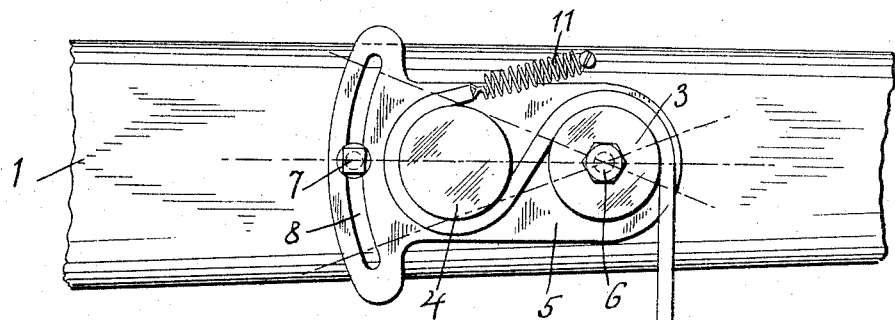
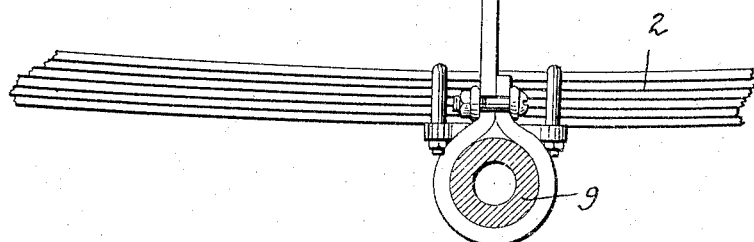
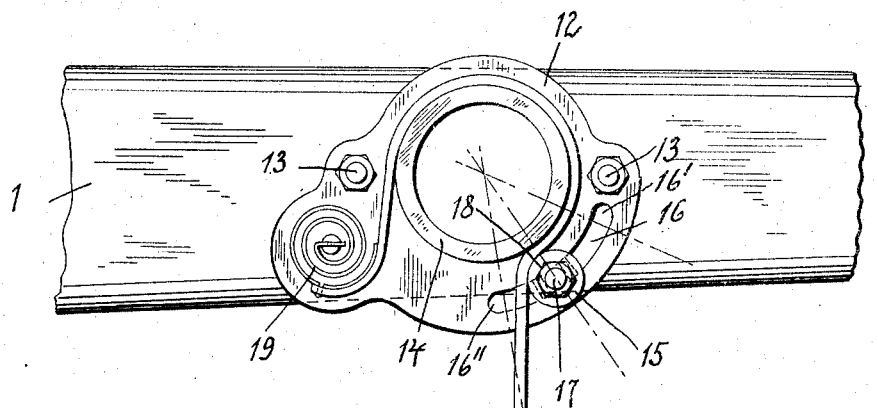

THOMAS VEITCH, OF DUMONT, NEW JERSEY, ASSIGNOR TO INTERNATIONAL PATENT CORPORATION, OF JERSEY CITY, NEW JERSEY, A CORPORATION OF SOUTH DAKOTA.

SHOCK-ABSORBER.

No. 907,427.　　　　Specification of Letters Patent.　　Patented Dec. 22, 1908.

Application filed October 29, 1907. Serial No. 399,627.

*To all whom it may concern:*

Be it known that I, THOMAS VEITCH, a citizen of the United States, and a resident of Dumont, in the county of Bergen and State of New Jersey, have invented certain new and useful Improvements in Shock-Absorbers, of which the following is a specification.

The present invention relates to shock absorbing devices for vehicles, and more particularly to shock absorbing devices adapted to be used on motor-vehicles.

The object of the present invention is to provide an improved shock absorber, having means for controlling the movement or vibrations of the spring-supported body of a vehicle relative to the running gear of the same, which device does not affect the action of the vehicle springs in compressing, but prevents the sudden reaction or rebound, which very often causes broken springs and uncomfortable riding quality on the vehicle.

The device consists essentially of a plurality of cylindrical bodies fastened against rotation to the body or to the spring-support of a vehicle, and a belt or band, one end of which is secured to a non-rotating part of the axle of the vehicle, passes over the surfaces of the cylindrical bodies, hereinbefore mentioned, and its free end is attached to a resilient member, which is secured to either a non-rotating part of the axle or to the body of the car or to the spring-support and causes the band to always remain tightly wrapped around the cylindrical bodies.

The invention is illustrated in the accompanying drawings, in which—

Figure 1 is a side elevation of the device, showing the same applied to a spring-supported vehicle, and Fig. 2 is a modification of the device.

1, in Fig. 1, indicates the frame which supports the body of the vehicle and which rests, as well known in the art, upon main springs 2.

The shock controlling device, embodied in the present invention, is interposed between the body of the vehicle and the axle or a stationarily supported part of the running gear, being attached at its lower and upper ends, respectively, to said body and axle or running gear. This shock absorbing device comprises a plurality of cylindrical bodies, such as drums, secured against rotation to the frame or body-support 1. In the device shown in Fig. 1, two drums 3 and 4 are shown fixedly secured to a base plate 5, the base plate proper being secured to the body-support by screws 6 and 7 in such a way that the base plate may be swung in a vertical plane around the screw 6, which acts as a pivot, the slot 8, engaging the screw 7, allowing of such angular displacement. It is obvious that in order to make such a displacement possible, screws 6 and 7 are loosened, the base plate 5 is then swung around the screw 6 to the desired position, and then the screws 6 and 7 are tightened, whereby the base plate and the cylindrical bodies 3 and 4, carried thereby, will be held in a desired position. The purpose of this angular displacement will be hereinafter more fully described.

To a stationary part of the axle 9 is fastened in any suitable way a non-resilient band or belt 10, preferably made of camel's hair or other non-stretching material. The belt runs over the cylindrical surface of the drum 3 and thence over drum 4, and is attached at its free end to a resilient member, such as a spring 11, which itself is secured to the body-support 1. The dimensions of the belt and spring are such, that the spring is held in its almost extended state, when the main springs of the vehicle are in their normal position, and the spring returns to its normal form when the main springs of the vehicle are compressed.

Fig. 2 shows a modification of the device in which a base plate 12 is fixedly secured to the body-support 1 by means of screws 13, 13. To this base plate is secured or integral therewith is made a drum 14, corresponding to the drum 3 of the device shown in Fig. 1. A comparatively smaller drum 15 is carried by the base plate 12 in such a way that its position relative to the drum 14 may be varied at will. As shown in the drawings, a slot 16 is formed on the base plate and protruding therethrough is arranged a bolt 17, carrying the drum 15, held thereon by means of a nut 18. It will be seen that by loosening the nut 18, the bolt and the drum, carried thereby, may slide up or down in the slot, and when in a desired position the nut is tightened, the drum 15 will be held in this position and against rotation. The band 10 is wrapped around the drum 14 and its free end is secured to a helical spring 19, secured to the base plate 12. It is obvious that the position of the drum 15 determines the length of the band wrapped around the drum 14. When a wheel of the vehicle strikes an obstruction in the road, the springs 2, supporting the body of the vehicle, are compressed; the two parts of the support of the spring on the axle and the frame of the vehicle are then brought closer together. When this occurs, the springs 11 or 19, as the case may be, will return to their normal position and the band or belt 10 slips freely around the surface of the drum. On the immediate rebound or opening of the springs 2 of the vehicle, the band and its spring, secured thereto, will cause a braking action on the drums, preventing thereby the sudden upward throw of the vehicle-body, in other words, the friction of the belt on the drum surface as the vehicle springs return to their normal position, prevents the quick rebound and throwing up of the body of the car, which is so objectionable to its passengers and fatal in many instances to the springs. It is obvious that the device does not interfere with the easy action of the vehicle-springs in compressing, but prevents the reaction or rebound of the same.

Should for any reason it be desired to increase or decrease the braking action of the belt, then it is necessary to wrap more or less of the length of the band or belt around the drum surfaces. To attain this object in the device, shown in Fig. 1 of the drawings, the screw 7 is loosened and the base plate 5 is swung around its pivot 6 in one or the other direction, whereby more or less of the band 10 will be in contact with the drums 3 and 4, thus the braking action will be increased or decreased.

In the device shown in Fig. 2, the drum 15 regulates the braking action of the belt. In placing the drum near to the upper end 16' of the slot 16, the length of the band in contact with the drum surface is decreased, while in placing the drum near to the lower end 16" of the slot the length is increased.

What I claim is:

1. The combination with a spring-supported vehicle body and its running gear, of a plurality of drums carried by one of said members, a band passing over the cylindrical surfaces of said drums and secured to the other of said members and adapted to slide freely on said drums when the springs of said vehicle are compressing and cause a braking action upon said drums on the rebound of said springs, and means for varying the position of said drums on their support so as to adjust the braking action of said band.

2. The combination with a spring-support-
ed vehicle body and its running gear, of a plurality of drums carried by one of said members, a band passing over said drums and connected to one of said members, a resilient means secured to said band and connected to the other of said members, and means for varying the positions of said drums on their support so as to vary the length of the band passing over the same.

3. The combination with a spring-supported vehicle body and its running gear, of a plurality of drums carried by one of said members, a band passing over said drums and connected to one of said members, a spring secured to said band and connected to the other of said members, and means for varying the positions of said drums on their support so as to vary the length of the band passing over the same.

4. The combination with a spring-supported vehicle body and its running gear, of a plurality of drums carried by one of said members, a band passing over the cylindrical surfaces of said drums and secured to the other of said members and adapted to slide freely on said drums when the springs of said vehicle are compressing and cause a braking action upon said drums on the rebound of said springs, and means adapted to change the relative position of said drums for adjusting the braking action of said band.

5. The combination with a spring-supported vehicle body and its running gear, of a plurality of drums carried by one of said members, a band passing over said drums and connected to one of said members, a resilient means secured to said band and connected to the other of said members, and means adapted to change the relative position of said drums for adjusting the braking action of said band.

6. The combination with a spring-supported vehicle body and its running gear, of a plurality of drums carried by one of said members, a band passing over said drums and connected to one of said members, a spring secured to said band and connected to the other of said members, and means adapted to change the relative position of said drums for adjusting the braking action of said band.

Signed at New York, in the county of New York, and State of New York, this 28th day of October, A. D. 1907.

THOMAS VEITCH

Witnesses:
SIGMUND HERZOG,
S. BIRNBAUM.